June 24, 1924.

H. P. KRAFT

HOSE OR PIPE COUPLING

Filed Oct. 14, 1922

1,499,063

INVENTOR:
Henry P. Kraft,
By Attorneys,

Patented June 24, 1924.

UNITED STATES PATENT OFFICE.

HENRY P. KRAFT, OF RIDGEWOOD, NEW JERSEY.

HOSE OR PIPE COUPLING.

Application filed October 14, 1922. Serial No. 594,573.

*To all whom it may concern:*

Be it known that I, HENRY P. KRAFT, a citizen of the United States of America, residing in Ridgewood, in the county of Bergen and State of New Jersey, have invented certain new and useful Improvements in Hose or Pipe Couplings, of which the following is a specification.

This invention relates to couplings, particularly intended for pipes, and is more especially directed to couplings for use in connection with manifold connections in vulcanizing apparatus.

The principal object of the invention is to provide an adjustable means for such couplings which can be very easily and quickly operated, and which will maintain the couplings in efficient, steam-tight connection at all times.

Such manifold connections usually comprise a quickly operable coupling designed to connect together the ingress pipes of a series of vulcanizing moulds as the latter are put in the press, and thereby connect up the steam supply pipe with all of the series of moulds. Because of the repeated coupling and uncoupling of the connections, and because of the heat involved, such couplings are made with a metal to metal joint, which for successful operation must be absolutely steam-tight. In the coupling members themselves there is usually provided some capacity for slight adjustment; that is to say, as the faces wear, the operating member of whatever kind is capable of forcing the members closer together to a small extent. When the wear becomes excessive, however, means must be provided for taking it up. In its preferred form my invention is best applicable to that type of coupling in which the connection is made through mutilated threads. In this type the coupling will operate efficiently throughout a slight range of movement by bringing the threads into a less or greater degree of engagement. When the maximum adjustment is reached, however, due to the changes in position of the threads, it is desirable to introduce an adjusting means which will in effect project one face of the coupling slightly further toward the complemental portion, thereby again restoring the thread connection to an initial operative position.

In the drawings, which illustrate one form of the invention,—

Figure 1:
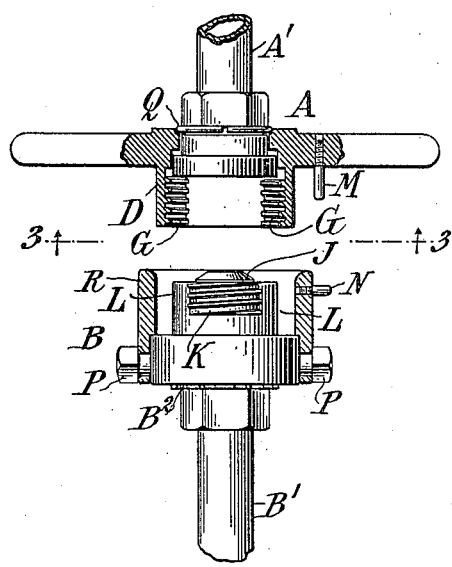
Figure 1 is a view of two members of a coupling of the mutilated thread type, the parts being shown as separated.
Figure 2:
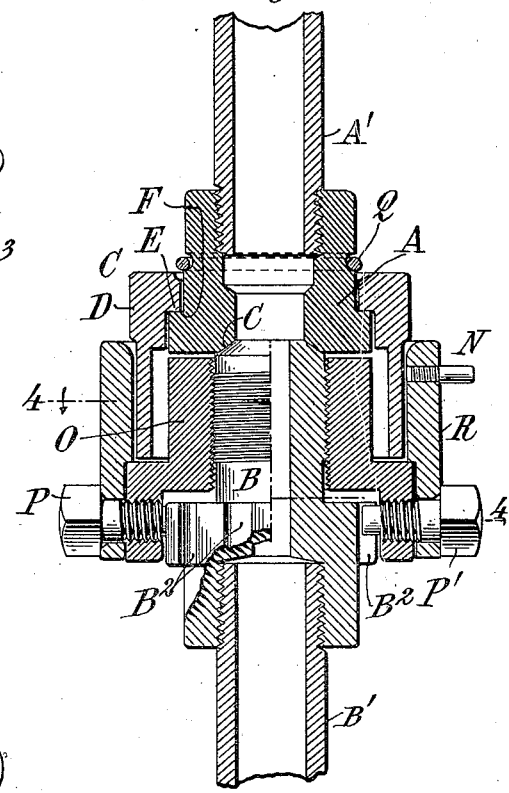
Fig. 2 is a similar view on a larger scale, the parts being shown as connected.
Figure 3:
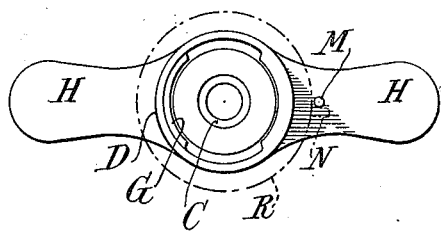
Fig. 3 is a view on the line 3—3 of Fig. 1.
Figure 4:
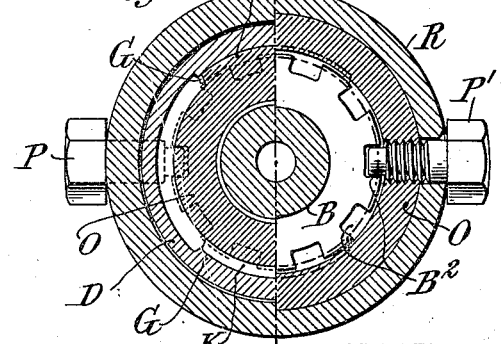
Fig. 4 is a section on the line 4—4 of Fig. 2.

Referring to the drawing, let A indicate the female member of the coupling, and B the male, each of which is connected to a pipe A' or B', preferably by a screw-threaded connection, as shown.

The female member of the coupling has a coupling seat C, which is preferably bevelled as shown, and is preferably of metal, although it will be understood that a packing may be introduced between the members, if desired. Swivelled on the member A is a coupling sleeve D, the latter being provided with a shoulder E which bears against a shoulder F formed on the member A. The interior of the coupling D is provided with a mutilated thread G, there preferably being two sections of threaded portions and two sections of unthreaded portions, as shown. The coupling sleeve D may be provided with operating handles H H if desired. J is the contacting face of the male member B which is designed to engage the face C of the female member, and is suitably shaped for the purpose. The member B carries an external mutilated thread K, which comprises two sections separated by non-threaded portions L, the construction being such that the threads of each of the members will slide in the unthreaded portions of the other member. When they have reached the point where the seating faces are approximately in contact, a rotation of the sleeve D will cause the threads to engage and force the seating faces together.

As the parts wear, the connection becomes so loose that the threads G and K, after engaging each other, will pass out of engagement, or if they be restrained from such extreme rotation by means of pins M N, as shown, the joint will not be fully closed before the limit of motion is reached.

According to the present invention I provide an adjustable means for compensating for extreme wear, so that a long life of the coupling is assured; so also if the seating faces should become injured, they may be turned off or redressed, and the removal of material compensated for.

In the coupling of the type just set forth, the thread K, instead of being formed upon the male member directly, is formed upon a screw-threaded sleeve O, which in turn is screwed upon the member B. By screwing the member O downwardly, the male member is given a relatively greater degree of projection and vice versa. In order to securely hold the sleeve O in its adjusted positions, the member B and the sleeve O are formed with inter-engaging means which will resist rotation when adjusted. In the construction shown, the member B is formed with a series of notches or recesses $B^2$, each of which is designed to be engaged by a bolt or bolts P P' passing through the screw-threaded sleeve O. By adjusting the sleeve O downwardly one notch in the construction shown, the seating face J is advanced one-tenth of the pitch of the thread on the member B. While any number of notches may be used, or any desired adjustment made, the construction shown is preferred, since the coupling threads G and K are capable of securing a tight joint between the seating faces at any point within a single adjustment of the sleeve. When the parts wear sufficiently, so that the threads G and K no longer hold well, the sleeve O is retracted, or the face J advanced. By this means a tight fit is always secured no matter what the condition of wear may be.

The swivelled sleeve D is best provided with means for preventing it slipping along the pipe A', such as the split ring Q, which enters an annular recess formed in the member A.

I prefer to provide a sleeve R, which is fastened to the sleeve O (or it may be a part thereof), which sleeve R forms a guide for the entering sleeve D, and also tends to a considerable extent to protect the face J against injury from extraneous objects. The sleeve also provides a very adequate protection for the mutilated threads K.

While I have shown and described one form of the invention, it will be understood that I do not wish to be limited thereto, since various changes may be made therein without departing from the spirit of the invention.

What I claim is:—

1. In a coupling, two complemental members, and connecting means comprising mutilated threads, one of said threads being carried by a swivelled sleeve, and the other of said threads being adjustable.

2. In a coupling, two complemental members, a coupling sleeve having an internal thread, and a sleeve carried by the other member having an external thread, and means for adjusting the position of said last-named sleeve with regard to the member which carries it.

3. In a coupling, a female member carrying a sleeve having an internal mutilated thread, and a male member carrying a sleeve having an external mutilated thread, said last-named sleeve screwing on the male member, and means for fixing said sleeve in varying positions longitudinally of said male member.

4. In a coupling, two complemental members, a sleeve carried by one having internal coupling means, a sleeve carried by the other having external coupling means, one of said sleeves being adjustable to vary the coupling action of the members, and a surrounding guard for protecting said external coupling means.

5. In a coupling, two complemental members, comprising a female member having a swivelled sleeve, a male member entering said sleeve, a sleeve on the male member, an internal thread on said swivelled sleeve, an external thread on said second sleeve, and a surrounding sleeve spaced apart from the sleeve on the male member, and extending outside of said swivelled sleeve when the parts are in coupled position, and means for adjusting the sleeve on said male member, comprising notches formed on said male member and entering projections carried by said sleeve.

6. In a coupling, two complemental coupling members, the first having a swivelled sleeve and the second member entering said sleeve, an adjustable sleeve on the second member, an internal thread on said swivelled sleeve, an external thread on said second sleeve, and a surrounding sleeve spaced apart from the sleeve on the second member, and extending outside of said swivelled sleeve when the parts are in coupled position.

In witness whereof, I have hereunto signed my name.

HENRY P. KRAFT.